United States Patent [19]

Denkowski et al.

[11] 4,022,309
[45] May 10, 1977

[54] DE-CLUTCH MECHANISM FOR VALVE OPERATOR

[75] Inventors: Walter J. Denkowski; John Zouzoulas, both of King of Prussia, Pa.

[73] Assignee: Philadelphia Gear Corporation, King of Prussia, Pa.

[22] Filed: Mar. 26, 1975

[21] Appl. No.: 562,231

[52] U.S. Cl. .............................. 192/48.5; 192/38; 192/114 R; 74/625; 64/DIG. 2
[51] Int. Cl.[2] .................. F16H 33/00; F16D 21/02
[58] Field of Search ........... 74/625; 192/114 R, 14, 192/16, 38, 48.5, 48.91

[56] References Cited

UNITED STATES PATENTS

| | | | |
|---|---|---|---|
| 2,050,910 | 8/1936 | Zancan | 192/108 X |
| 3,066,777 | 12/1962 | Hoffman | 192/38 |
| 3,198,033 | 8/1965 | Fry | 74/625 |
| 3,262,532 | 7/1966 | Phelps | 192/16 X |
| 3,383,948 | 5/1968 | Palmer et al. | 192/114 X |
| 3,414,097 | 12/1968 | Denkowski | 192/38 X |
| 3,416,566 | 12/1968 | Anderson | 74/625 X |
| 3,515,250 | 6/1970 | Cantalupo | 192/114 X |
| 3,554,337 | 1/1971 | Denkowski | 192/16 |

*Primary Examiner*—Benjamin W. Wyche
*Attorney, Agent, or Firm*—Paul & Paul

[57] ABSTRACT

A de-clutch mechanism is actuated, when the power is off, by manual actuation of a de-clutch lever shaft. When thus actuated, the de-clutch mechanism couples a rotatable driven sleeve to a handwheel drive and decouples the sleeve from the power drive. When the power is activated, the de-clutch mechanism automatically disconnects the handwheel drive. A typical application of the de-clutch mechanism is in valve operators.

5 Claims, 10 Drawing Figures

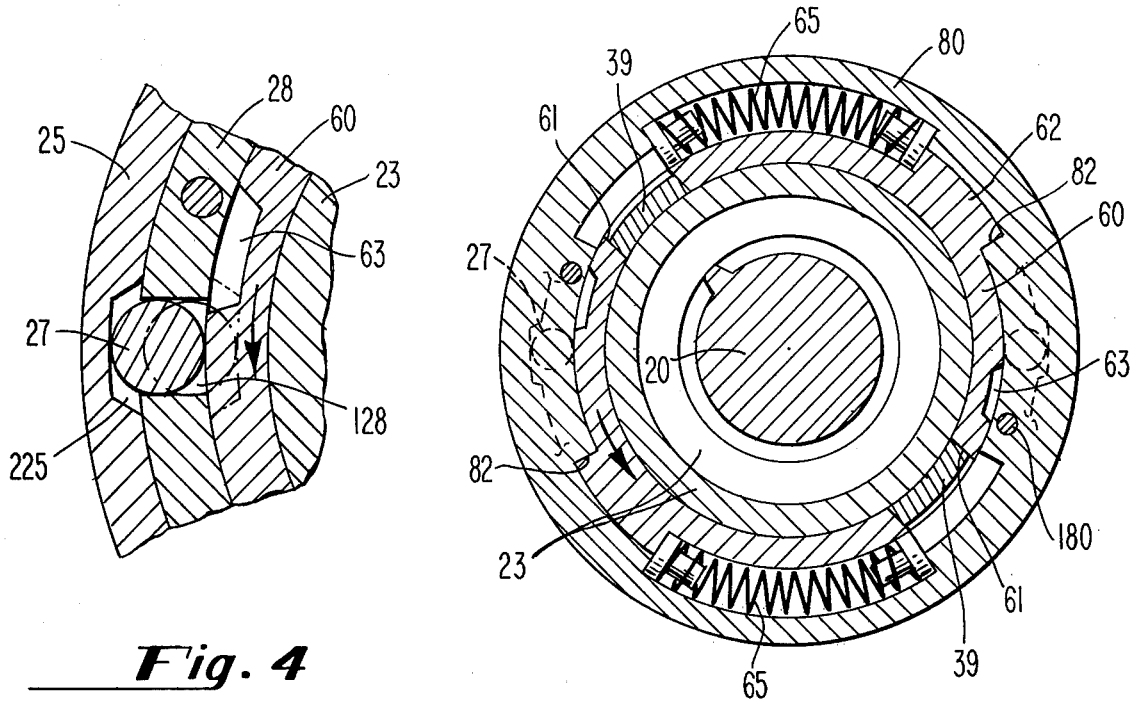
Fig. 4
Fig. 2
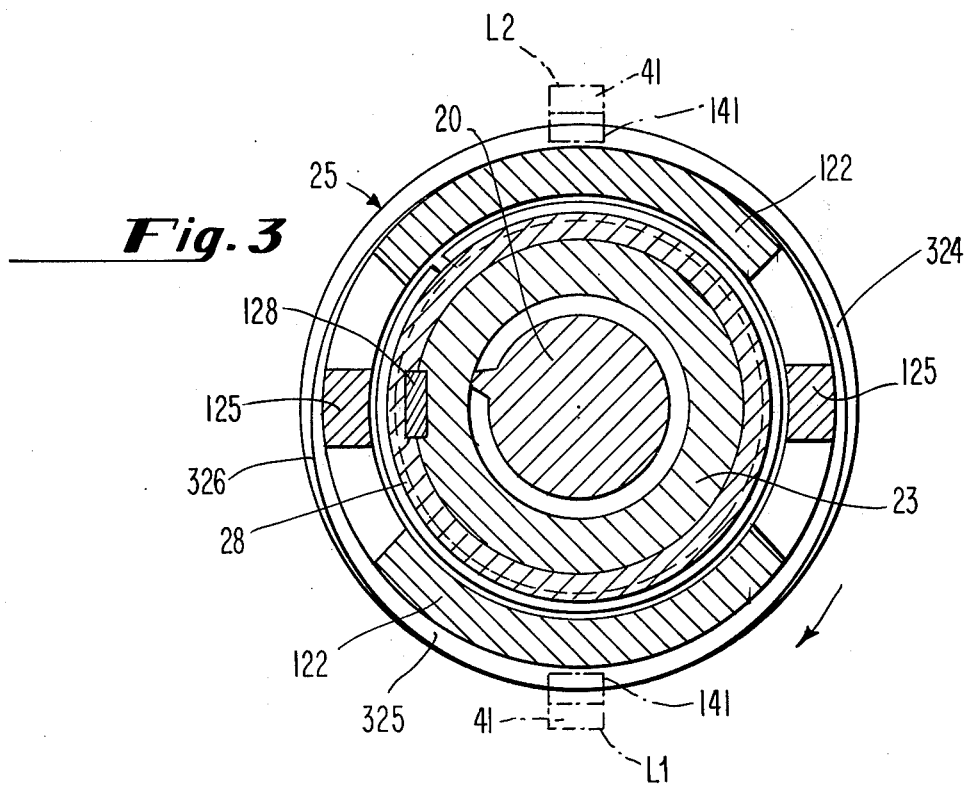
Fig. 3

DE-CLUTCH MECHANISM FOR VALVE OPERATOR

BACKGROUND OF THE INVENTION

The present invention relates to a de-clutch mechanism for coupling a rotatable driven load member to a secondary drive and decoupling the power drive when the primary drive is inactive, and for disconnecting the secondary drive and automatically connecting the power drive when the primary drive is actuated. The primary drive is typically a power drive while the secondary drive is ordinarily a manual handwheel drive.

While a de-clutch mechanism of the type here involved may have other uses, the mechanism is particularly suited for use in valve operators. Valve operators are power driven operating mechanisms used for opening and closing large valves. In such cases, the rotatable member which is to be driven by either the primary or secondary drive, is an internally threaded drive sleeve or nut which, when driven rotationally, moves an externally threaded valve stem in one axial direction or the other, thereby to move the valve toward its open or closed position. The drive sleeve or nut is typically driven by a worm gear driven by a power driven worm shaft.

If, for adjustment or maintenance purposes, or in the event of a power failure, or for any other reason, it is desired to rotate the drive sleeve manually, as by a handwheel, while the power is off, a de-clutch mechanism must be provided for shifting the drive from power drive to manual drive, and for returning the drive automatically from manual to power drive means when the power is available.

SUMMARY OF THE INVENTION

While many manual clutching systems have been developed, the principal object of the present invention is to provide reliable de-clutch mechanism which will allow the drive to shift into manual handwheel position and disconnect from power drive while under heavy external loads. This feature is lacking in other systems because of frictional lock. When the power comes on, the new de-clutch mechanism is effective to disconnect automatically the handwheel drive and to connect the power drive.

The foregoing object is achieved by a mechanism which requires the attendent to rotate manually a shaft to shift the clutch mechanism into handwheel drive and out of power drive. When, however, the power comes on, the de-clutch mechanism automatically disconnects the handwheel drive and shifts to power drive.

BRIEF DESCRIPTION OF THE DRAWINGS

FIG. 2 is a view, in section, looking down along the line 2—2 of FIG. 1.

FIG. 3 is a view, in section, looking up along the line 3—3 of FIG. 1.

FIG. 4 is an enlarged fragmentary view, in section, looking down along the line 4—4 of FIG. 1.

DETAILED DESCRIPTION OF THE PREFERRED EMBODIMENTS

Figure 1:
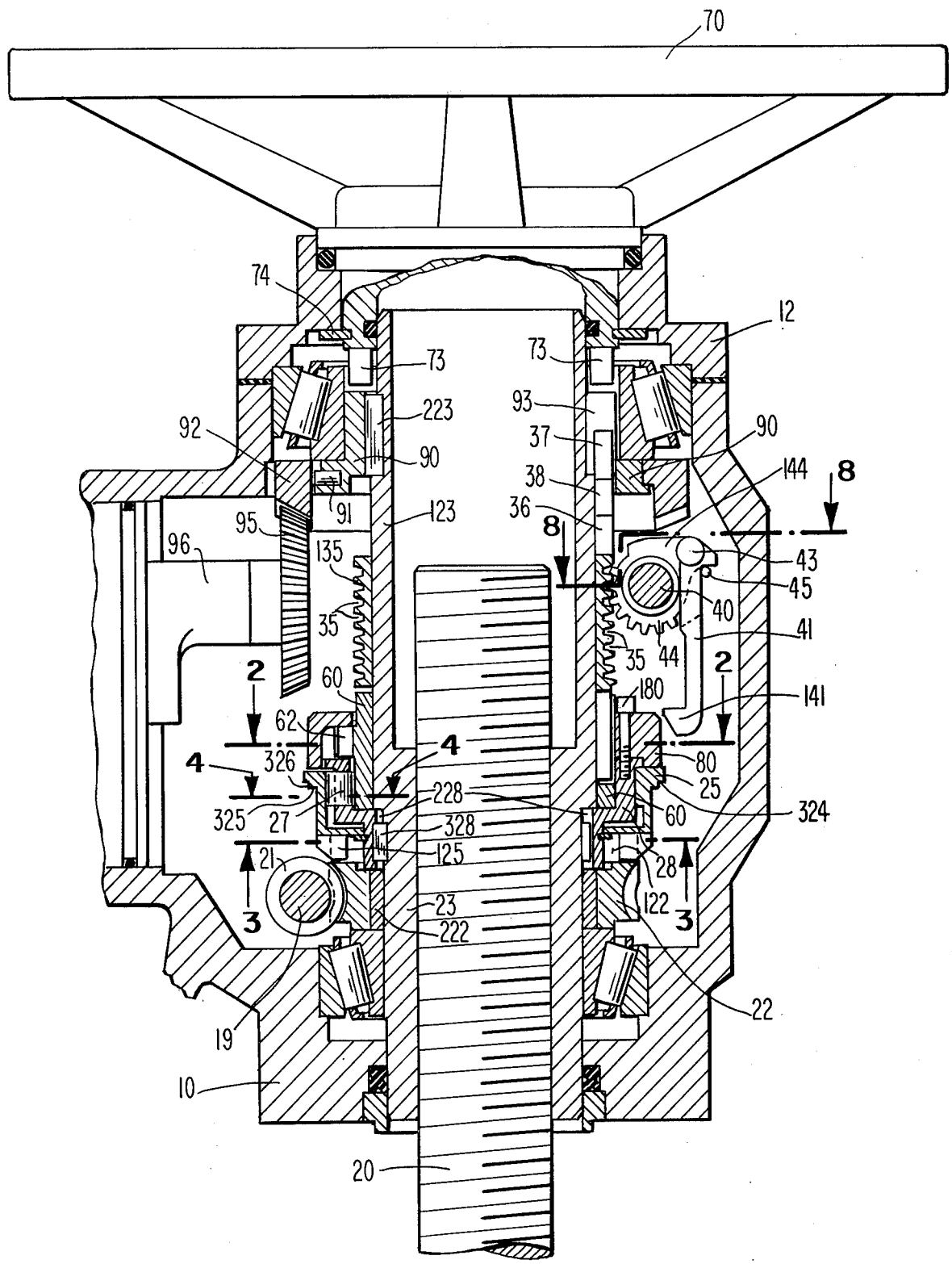
FIG. 1 is an elevational view, largely in section, of a portion of a valve operating mechanism which includes a de-clutch mechanism according to the present invention.

Referring now to FIG. 1, a power driven worm shaft 19 is driven by a motor or other form of power not shown. The worm 21 is in engagement with and drives rotationally a worm gear 22 which is spaced by spacer 222 from the drive sleeve 23. Worm gear 22 has a pair of upstanding lugs 122 adapted to engage a pair of lugs 125 which extend downwardly from a motor clutch ring 25. The motor clutch ring 25 is adapted, through a pair of detent rollers 27, to drive a cup-shaped drive ring 28 which is positioned within the motor clutch ring. The lower portion of the drive ring 28 is connected through splines 228, and aligned as by alignment key 328 to the drive sleeve 23. The drive sleeve 23 is internally threaded and is in threaded engagement with the externally threaded valve stem 20.

It will be seen from the foregoing description that when the worm shaft 19 is driven rotationally, as by a power drive, the drive sleeve 23 is driven rotationally in a corresponding manner. The drive train may be traced from the worm shaft 19 through the worm 21, worm gear 22, upstanding lugs 122, depending lugs 125, the motor clutch ring 25, the detent rollers 27, the drive ring 28, the key 328, and the drive sleeve 23. Rotation of drive sleeve 23 causes the valve stem 20 to move axially in either the upward or downward direction according to the direction of rotation of drive sleeve 23.

During motor or power drive, just described, the handwheel 70 is disconnected from the drive.

As seen in FIG. 1, the upper portion 123 of the drive sleeve 23 drives, through a key 223, a ring member 90 which is pinned, as by pin 91, to a bevel gear 92 which is in mesh with and drives a bevel pinion 95 mounted on a shaft 96. Shaft 96 may extend to and operate either a limit switch mechanism of known type or a counter mechanism, neither of which is shown, not being an essential part of the present invention.

Ring member 90 also functions as a cam ring for a purpose to be described later.

Figure 5:
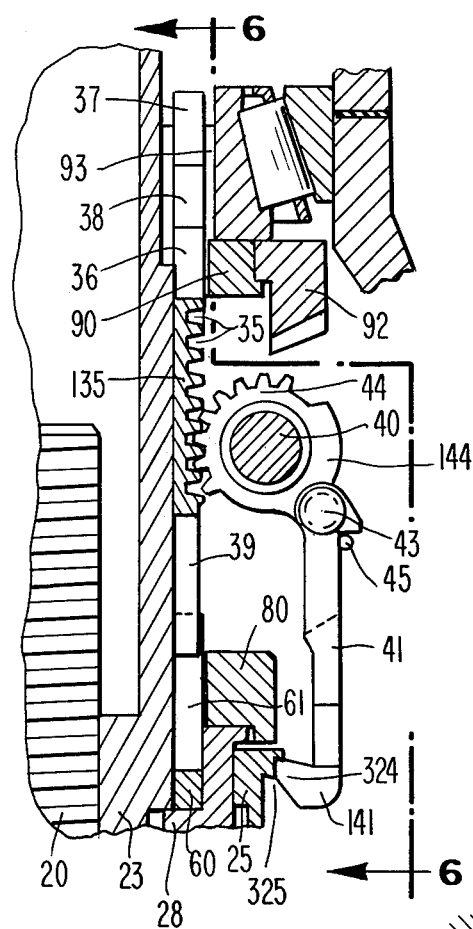
FIG. 5 is an enlarged fragmentary view of the right hand portion of the mechanism shown in FIG. 1, but showing the latch 41 in latched position rather than in unlatched position.

Referring now to FIGS. 1 and 5, in the event of power failure, or if for any other reason an attendent wants to operate the valve mechanism manually with the power off, the attendent manually, as by a crank or a lever not shown, rotates a pinion de-clutch shaft 40 through about 180°, in a clockwise direction as viewed in FIGS. 1 and 5. Secured to shaft 40 is the pinion 44 having a fixed number of teeth, which are engaged within the circumferential grooves 135 of a clutch sleeve 35. The configuration of clutch sleeve 35 is shown in perspective in FIG. 7.

Figure 7:
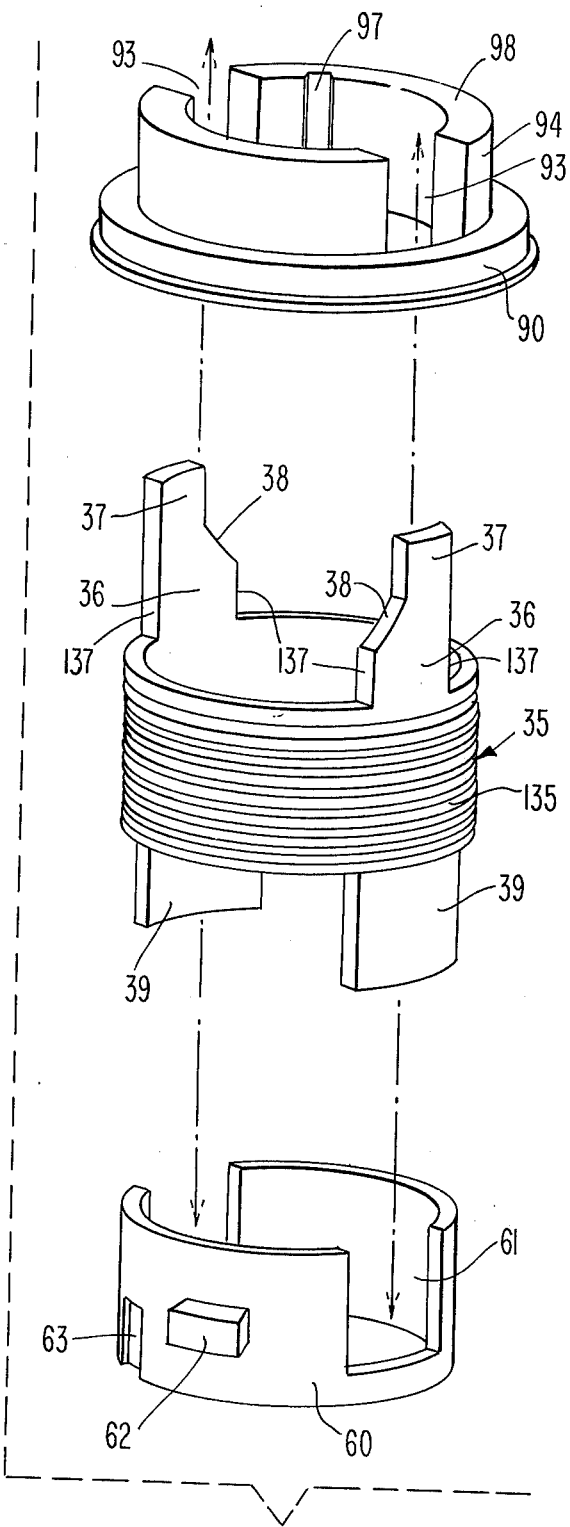
FIG. 7 is an exploded perspective view showing the clutch sleeve 35, the lug ring 60 (positioned below the clutch sleeve), and the camming ring 90 (positioned above the clutch sleeve).

As seen in FIG. 7, extending upwardly from the main body of clutch sleeve 35 are a pair of opposed arms 36 spaced 180° apart. Arms 36 have wider base and narrower upper end portions 37, forming between the upper end and base portions the inclined surfaces 38 which functions as cam surfaces, as will be described.

Extending downwardly from the main body of clutch sleeve 35 are a pair of opposed legs 39 spaced 180° apart. (In the actual physical embodiment, the pair of depending legs 39 are located in vertical planes which are spaced 90° from the planes of the pair of upwardly extending arms 36. However, for convenience of illustration in FIG. 1, which is a sectional view, depending legs 39 have been shown to be located in the same vertical planes as the upwardly extending arms 36. To be consistent, this same relationship has been shown in the perspective view in FIG. 7).

Positioned below clutch sleeve 35 is a lug ring 60 which is supported on the annular floor of the cup-shaped drive ring 28. The wall of lug ring 60 is provided with a pair of opposed slots 61 which are located to receive the downwardly extending legs 39 of clutch sleeve 35. Extending radially outwardly from the wall of lug ring 60 are a pair of opposed lugs 62 spaced 180° apart. These lugs 62 are located in the upper half of the lug-ring wall. In the lower part of the lug-ring wall, in the outer surface thereof, are a pair of recesses 63. These recesses 63 are adapted to receive the detent rollers 27. In FIG. 7, one of the recesses 63 has been shown. The recess 63 which is visible in FIG. 7 is actually located closer to the left slot 61 than is illustrated in the drawing. Actually, the recess 63 is only 11° removed from the slot. In its true position, the recess 63 would not have been visible in FIG. 7.

Positioned above the clutch sleeve 35 is the ring member 90 on which bevel gear 92 is pinned. Ring member 90 also functions as a cam ring, as will now be described. Ring 90 has a pair of opposed slots 93 in its annular wall 94. The interior surface of wall 94 is provided with a keyway 97 for the key 223 which connects the ring member 90 to the drive sleeve 23, as seen in FIG. 1.

Referring now to FIGS. 1, 5, 6 and 7, when the hand operated de-clutch shaft 40 is turned clockwise, as viewed in FIGS. 1 and 5, the pinion 44 lifts the clutch sleeve 35 from its lowered position shown in FIG. 1 to its raised position shown in FIG. 5. When the sleeve 35 is so raised, the upstanding arms 36 are moved downwardly through the slots 93 in the ring member 90. When this is done, the inclined cam surfaces 38 of the upstanding arms 36 engage the lower left edge of the respective slot 93 in the wall 94 of the ring member 90. The ring member 90, being keyed to drive sleeve 23, is locked against rotation in respect to drive sleeve 23. Thus, when the clutch sleeve 35 is raised, the inclined cam surfaces 38 cam the sleeve 35 angularly counterclockwise, as viewed in FIG. 7. When the clutch sleeve 35 so moves (the presently preferred magnitude of the angular movement is 11°), the depending legs 39 cause the lug ring 60 to move angularly in a corresponding manner. As viewed in FIG. 4, this shifts the recess 63 from the solid-line position to the position shown in phantom. As seen in FIG. 4, in this shifted position, recess 63 is in radial alignment with slot 128 in the drive ring 28. The pair of slots 128 are the slots which carry the pair of detent rollers 27. When the lug ring 60 is thus moved angularly in the counterclockwise direction (as viewed in FIG. 2), the radially projecting lugs 62 of the lug ring 60 compress the compression spring 65.

Referring again to FIGS. 1, 5, 6 and 7, when the clutch sleeve 35 is raised by the pinion 44, the uppermost ends 37 of the pair of upstanding arms 36 are lifted above the upper surface 98 of the annular wall 94 of the ring member 90, as seen in FIG. 6. In this raised position, the portions 37 of the arms 36 are adapted to be engaged by the depending lugs 73 of the handwheel 70. These depending lugs 73 are seen in FIG. 1.

Figure 6:
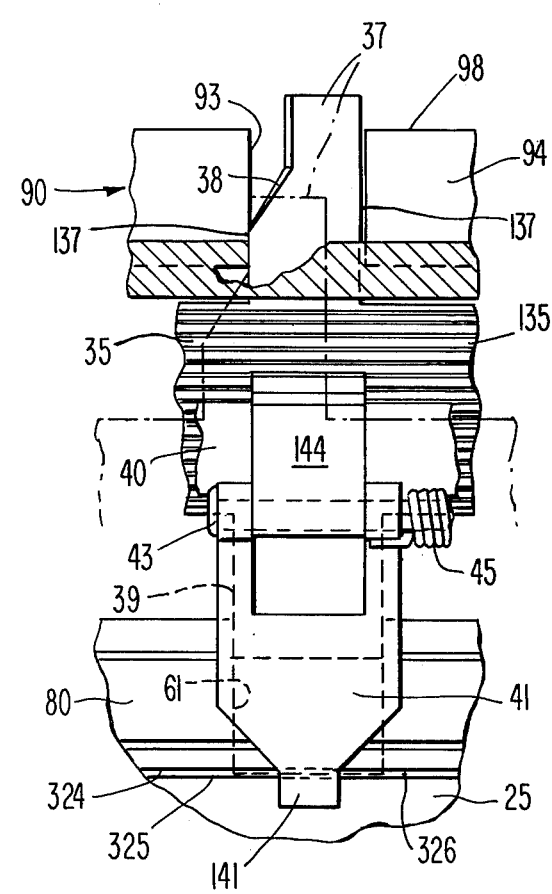
FIG. 6 is an elevational view looking along the line 6—6 of FIG. 5.
Figure 8:
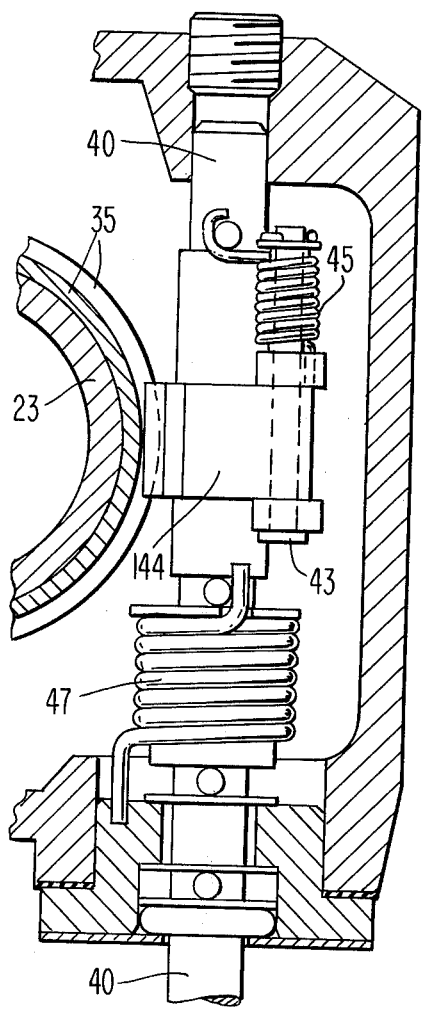
FIG. 8 is an enlarged view looking down along the line 8—8 of FIG. 1.

It will be seen, after the attendent has set the de-clutch shaft 40 in handwheel position, that when the handwheel 70 is rotated manually, the lugs 73 engage the upstanding portions 37 of the clutch sleeve 35 and cause the sleeve 35 to be driven rotationally. The lower sides 137 of upstanding lugs 37 of sleeve 35 drive rotationally ring member 90 (through sides of slots 93) as seen in FIG. 6.

Figure 9:
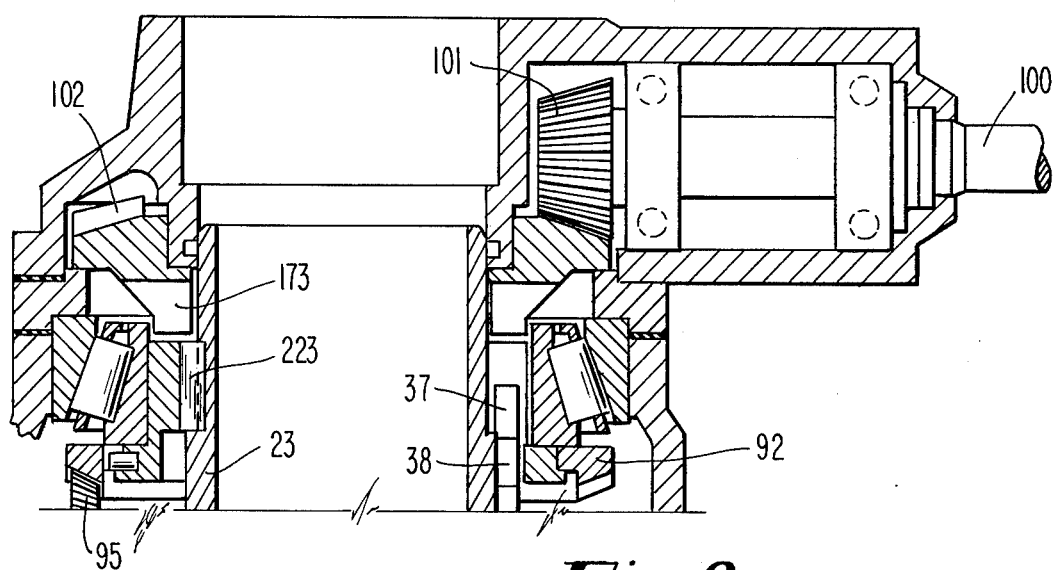
FIG. 9 is a fragmentary view of a modified form of valve operating mechanism in which the handwheel shaft is disposed at right angles to the axis of the valve stem.

The ring member 90 drives, in a corresponding manner, drive sleeve 23 by means of key 223 as seen in FIGS. 1 and 9. Drive ring 28 is locked on drive sleeve 23 by means of splines 228 and key 328 and is rotated along the drive sleeve 23 as seen in FIG. 1. Thus, ring 28 must be decoupled from the motor drive when the handwheel 70 is rotated, to avoid trying to drive the motor drive manually.

When the drive ring 28 is driven rotationally by key and splines as previously described, the pair of detent rollers 27, one of which is seen in FIG. 4, move into the recesses 63 since, as previously described, the recesses 63 were shifted into radial alignment with the slots 128 in the drive ring 28 by the action of the cam surfaces 38 when the clutch sleeve 35 was raised. When the drive ring 28 is moved rotationally, the detent rollers 27 are cammed from the solid line position shown in FIG. 4 into the phantom position shown in FIG. 4 by the inclined walls of the recesses 225 in the motor clutch ring 25 which is now stationary. As viewed in FIG. 4, the lower inclined wall of the recess 225 is effective, when drive ring 28 is moved counterclockwise, to cam roller 27 into the slot 128 of the drive ring 28 and into the recess 63 of the lug ring 60. As a result, the drive ring 28 moves angularly, relative to the motor clutch ring 25.

Since ring member 90 is connected by key 223 to drive sleeve 23, it will be seen that the handwheel 70 is now effective to drive the drive sleeve 23 rotationally. As a result, the stem 20 may be moved axially in its upward or downward direction according to the direction of rotation of handwheel 70.

Referring now to FIGS. 1, 5, 6 and 8, when the de-clutch pinion shaft 40 is manually rotated clockwise to lift the clutch sleeve 35 to its upper position, in which the ends 37 of the arms 36 are in position to be engaged by the depending lugs 73 of the handwheel 70, a hook latch 41 which is pinned, as by pin 43, to portion 144 of pinion 44, is lowered from the position illustrated in FIG. 1 to the position illustrated in FIG. 5. A torsion spring 45 on pin 43, seen in FIG. 8, urges the latch 41 in a clockwise direction as viewed in FIGS. 1 and 5. Another torsion spring 47 on the de-clutch pinion shaft 40 urges shaft 40 to move in a counterclockwise direction. As a result, when the attendent stops turning the de-clutch shaft 40 in the clockwise direction to lift the clutch sleeve, the pinion shaft 40 returns counterclockwise, under the torque influence of spring 47, sufficiently to cause the hooked end 141 of the latch member 41 to be pulled upwardly into engagement with the undersurface of the lip of the motor clutch ring 25. This has the effect of locking the clutch sleeve 35 in a fixed raised position in which the portion 37 projects above the upper edge 98 of the wall 94 of the ring member 90, as is illustrated in FIG. 6.

Figure 5A:
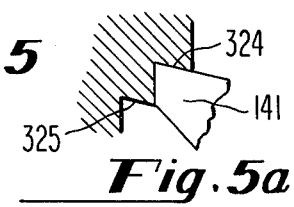
FIG. 5a is a further enlargement of the hooked end of the latch member showing how it engages the upper cam of the clutch ring.

The undersurface of the lip of motor clutch ring 25, which is engaged by the hook 141 of latch 41, is designed as a pair of cams, an upper cam 324 and a lower cam 325, as seen enlarged in FIG. 5(a). Each of these cams extends for approximately 270°, so that their end portions are overlapping. The function of these cams is to cam the hook 141 off the lip of ring 25 when the ring 25 is rotated.

Assume that, with the mechanism in handwheel drive, the power comes on. The worm shaft 19 is then driven rotationally to drive the worm gear 22. When this occurs, the motor clutch ring 25, as has already been described, is driven rotationally. Referring now to FIG. 3, assume that when the motor power went off the worm gear 22 and motor clutch ring 25 were in such rotational (angular) position that the hook 141 of latch 41 is in the relative position L1 shown in phantom at the bottom of FIG. 3. In this position, the hook 141 is pulled up against the surface of the lower cam 325. When the clutch ring 25 is driven rotationally, clockwise as viewed in FIG. 3, the surface of lower cam 325 against which hook 141 is bearing, gradually decreases, and after a rotation of about 130° the cam surface is so small that the hook 141 is pulled, by the action of spring 47, to the surface of the upper cam 324. Thereafter, as rotation continues, the hook 141 is gradually cammed off the upper cam 324 by the front wall 326 of the lower cam 325. In this example, a total rotation of the order of 310° is required to push the hook 141 off the lip of the clutch ring 25. This assumed that the hook 141 is in the relative position L1 when the motor power comes on. It is to be understood that it is the cam which moves; the hook 141 angularly stationary.

If, when the motor power comes on, the hook 141 is in the relative position L2, shown in phantom at the top of FIG. 3, the hook 141 is already bearing against the upper cam 324, and in such case, only about 130° of rotation of the clutch ring 25 is required to cam the hook 141 off the lip of the ring 25.

It will be understood that the positions L1 and L2 illustrated in phantom in FIG. 3, are but two of the many positions which the hook 141 could be in when the power comes on, and that the number of degrees of rotation of the clutch ring 25 necessary to release the hook latch 41, after the power comes on, ranges from 15° –20° (approximately) to 360° (approximately).

If while the attendent is manually rotating handwheel 70, the power should come on and the worm shaft 19 be driven rotationally, the motor clutch ring 25 will be driven rotationally through the engagement of worm gear lugs 122 and the motor clutch ring lugs 125. When that happens, the eccentric surface 326 of motor clutch ring 25, cams latch hook 141 off the under surface of the lip of motor clutch ring 25, as just described above. The heavy torsion spring 47 is able to rotate the pinion de-clutch shaft 40 in the counterclockwise direction, as viewed in FIGS. 1 and 5. This pulls the clutch sleeve 35 immediately and rapidly down from its raised position, thereby moving the upper end portion 37 of arms 36 from the path of the lugs 73 of the handwheel 70. In this manner, handwheel 70 is automatically disconnected from the drive when the power comes on. When this happens, the recesses 225 of the motor clutch ring 25 come into radially alignment with the slots 128, the detent rollers 27 will move out of the recess 63 and into the recess 225. This happens because the rollers are being cammed in a radially outward direction by the inclined wall of the recess 63 of the lug ring 60 which has been angularly moved by the compress spring 65 as viewed in FIGS. 2 and 4. Thereafter, the drive ring 28 will be driven by the motor clutch ring 25.

It will be seen that, by the present invention, there is provided, in combination, a rotational load member 23, a primary rotational drive 19, 21, 22, clutch means 25, 27, 28, 60 normally connecting the primary drive to the load member, a secondary rotational drive 70, manually operable de-clutch means 35, 90, 60 coupled to said clutch means and normally disconnecting the secondary drive 70 from the load member 23, said manually operable de-clutch means 35 adapted to be shifted from normal to shifted position to connect the secondary drive 70 to the drive sleeve 23 and to disconnect the motor drive, the de-clutch, means being adapted to automatically disconnect the secondary drive and connect the primary drive in response to activation of the primary drive.

It will be further seen that the manually operable de-clutch means includes latch means 40, 41 for latching the de-clutch means 35 in its shifted position.

It will be further seen that, in the illustrated embodiment, the latch means includes spring bias means 45 tending to maintain the latch means in latched position, that cam means 324, 325 are provided for unlatching the latch means when the motor power comes on, and that the de-clutch means 35 includes spring bias means 47 tending to return the de-clutch means to normal position when the latch means is unlatched.

FIG. 9 illustrates that the de-clutch mechanism of the present invention may be applied to a valve operating mechanism in which the handwheel drive shaft is at right angles to the stem as well as to the form of valve operating mechanism shown in FIG. 1 in which the handwheel is rotatable about an axis which coincides with the axis of the drive sleeve 23 and valve stem 20. In FIG. 9 the handwheel shaft 100 has secured thereto a bevel gear 101 which drives a bevel gear 102 which is part of the handwheel adapter 172 having depending lugs 173 which are adapted to be engaged by the lugs 37 of the sleeve 35 when the sleeve is lifted to its raised position.

What is claimed is:
1. A drive control mechanism for a valve stem nut or other rotational load member, said mechanism comprising:
   a. a primary rotational power drive;
   b. clutch means normally connecting said power drive to said load member through low-friction rolling elements;
   c. a secondary rotational handwheel drive;
   d. de-clutch means normally disconnecting said handwheel drive from said load member, said de-clutch means adapted to be shifted manually in the axial direction of said load member from normal to shifted position, said de-clutch means in shifted position adapted to connect said handwheel drive to said load member;
   e. said de-clutch means including
      e-1 common means operately associated with said clutch means for utilizing said low-friction rolling elements to disconnect said power drive;

e-2 means for automatically disconnecting said handwheel drive and connecting said power drive in response to actuation of said power drive;

e-3 latch means for latching said declutch means in shifted position;

f. said clutch means including f-1 an outer annular member;

f-2 an inner annular member;

f-3 an intermediate annular member positioned between said outer and inner members, all of said annular members being concentric;

f-4 said intermediate member being provided with slots extending radially through said intermediate member;

f-5 detent rollers in said slots;

f-6 said rollers having diameters which exceed the radial thickness of said intermediate member;

f-7 recesses in said outer and inner annular members for receiving portions of said detent rollers which project beyond said intermediate member; and f-8 bias means for normally maintaining said recesses in said inner member out of radial alignment with said slots.

2. The combination of claim 1 wherein:

a. said de-clutch means include first bias means urging said de-clutch means toward normal position.

3. The combination of claim 2 wherein said latch means includes second bias means urging said latch means into latched position.

4. The combination of claim 3 wherein cam means are provided for automatically unlatching said latch means in response to activation of said primary drive.

5. A valve operating mechanism having power and manual drives for driving an externally threaded valve stem (20), said mechanism including:

a. a plurality of annular members each concentric with each other and comprising, in order beginning with the outermost, a first ring member (25) connected to the power drive (21,22) and having recesses (225) in its inward wall, a second ring member (28) having slots (128) therethrough containing rolling elements (27) whose diameter is larger than the thickness of said second ring member, a third ring member (60) having recesses (63) in its outward wall, and a fourth ring member (23) having internal threads intermeshing with the external threads of said valve stem (20);

b. biasing spring means (65) normally maintaining the recesses (63) in the outward wall of said third ring member (60) out of alignment with the slots (128) in said second ring member (28), whereby the rolling elements (27) in the slots (128) of said second ring member (28) normally project into the recesses (225) in the inward walls of said first ring member (25) whereby said first power driven ring member (25) drives said second ring member (28) through said rolling elements (27);

c. key means (328) connecting said second ring member (28) to said fourth ring member (23) whereby when said second ring member (28) is driven said fourth ring member (23) is also driven;

d. fifth (35) and sixth (90) ring members axially displaced from said third ring member (60) but in alignment therewith;

e. manually operable means (40,44) for shifting said fifth ring member (35) axially into engagement with the manual drive (70, 73) and for camming (38) said third ring member (60) angularly against the action of said biasing spring (65) for shifting the recesses (63) in the outward wall of said third ring member (60) into alignment with the slots (128) in said second ring member (28) whereby said manual drive, in driving said fifth ring member (35), also drives said sixth (90) third (60), fourth (23), and second (28) ring members, whereby said second ring member (28) forces said roller elements (27) to move radially inwardly out of the recesses in said first ring member (25) and into the recesses in said third ring member (60), whereby said second (28), third (60) and fourth (23) ring members are driven manually while said first ring member (25) remains locked to said stationary power drive;

f. latch means for latching said manually operable shifting means in manual-drive engagement; and g. cam means for automatically unlatching said latch means in response to activation of said power drive.

* * * * *